July 21, 1936. C. C. FARMER 2,048,327
FLUID PRESSURE BRAKE
Original Filed Jan. 19, 1932
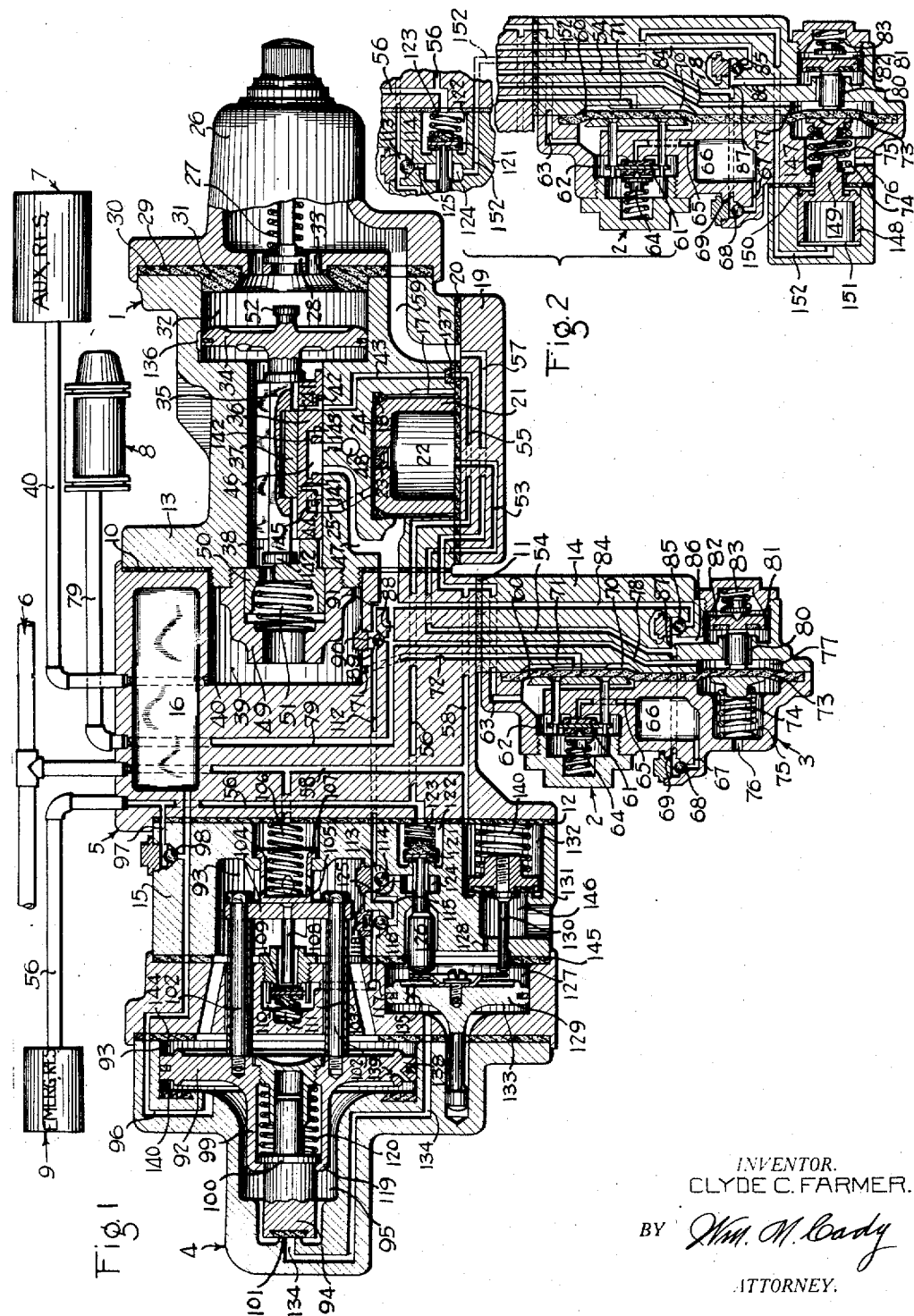
INVENTOR.
CLYDE C. FARMER.
BY Wm. M. Cady
ATTORNEY.

Patented July 21, 1936

2,048,327

UNITED STATES PATENT OFFICE 2,048,327

FLUID PRESSURE BRAKE

Clyde C. Farmer, Pittsburgh, Pa., assignor to The Westinghouse Air Brake Company, Wilmerding, Pa., a corporation of Pennsylvania Application January 19, 1932, Serial No. 587,476
Renewed December 18, 1935

34 Claims. (Cl. 303—35)

This invention relates to fluid pressure brake equipment which operates according to variations in brake pipe pressure to control the application and release of the brakes.

For the purpose of economy, there is a continuing tendency to increase the number of cars in a train and where heretofore a freight train might consist of one hundred cars, it is now desired to operate trains of one hundred and fifty or more cars.

The brake equipment at present employed was originally designed to operate in trains up to one hundred cars, but with the continuing increase in train length, various operating difficulties are being encountered and especially in obtaining the desired operation of the equipment on the cars at the rear end of a long train.

One object of my invention is to provide an improved fluid pressure brake equipment capable of handling very long trains and which is adapted to utilize, without excessive or costly alterations, the ordinary triple valve device now employed on railway cars, as a part of the improved equipment, so that in case the improved equipment is substituted for the equipment now in use, it will not be necessary to discard or scrap the old triple valve device.

Another object of my invention is to provide a fluid pressure brake equipment having means for varying the rate of brake cylinder pressure built up during both service and emergency applications of the brakes.

According to the above object, I provide means for supplying an initial inshot of fluid under pressure to the brake cylinder of sufficient degree to move the brake cylinder piston outwardly so as to bring the brake shoes into braking engagement with the car wheels with a moderate pressure, but not with sufficient force as to cause the slack in the train to run in harshly, followed by a slow build up of brake cylinder pressure which also serves to assist in preventing the harsh run in of slack.

It has heretofore been proposed to provide a quick service modifying valve device which is operative, upon the development of a predetermined brake cylinder pressure, to cut off the local quick service venting of fluid under pressure from the brake pipe, and it has also been proposed to provide a valve device for providing an initial inshot of fluid under pressure to the brake cylinder, and another object of my invention is to provide a valve device which not only controls the local venting of fluid under pressure from the brake pipe but also functions to regulate the initial inshot of fluid under pressure to the brake cylinder.

Another object of my invention is to provide an improved emergency valve device which will be more sensitive to variations in fluid pressures than the usual type of emergency valve device in which the emergency slide valves offer considerable resistance to the movement of the emergency piston in its travel to any of its several operating positions.

Heretofore, the quick action piston, which is associated with the emergency valve device, has been employed for the sole purpose of actuating the quick action vent valve, in effecting an emergency application of the brakes, to locally vent fluid under pressure from the brake pipe to propagate quick action serially throughout the length of the train and a further object of my invention is to utilize the quick action piston to not only actuate the quick action vent valve in the manner just described, but to also actuate an emergency valve to supply fluid under pressure to the brake cylinder.

In releasing the brakes after an application of the brakes it is desirable to back dump fluid under pressure from the brake cylinder to the brake pipe to accelerate the recharge of the equipment. It has heretofore been proposed to effect this back dump through the medium of a cavity in the main slide valve of the emergency valve device. According to another feature of my invention, this back dump of fluid under pressure from the brake cylinder to the brake pipe is effected through the medium of a poppet type of valve which is controlled by the emergency piston.

Other objects and advantages will appear in the following more detailed description of the invention.

In the accompanying drawing; Fig. 1 is a diagrammatic view, mainly in section, of a fluid pressure brake equipment constructed in accordance with the invention; and Fig. 2 is a fragmentary sectional view of a modification of the combined inshot and quick service modifying valve device of the equipment.

As shown in the drawing, my improved equipment may comprise a triple valve device 1, a quick service valve device 2, a combined inshot and quick service modifying valve device 3, an emergency valve device 4, a pipe bracket 5 on which said devices are mounted, a brake pipe 6, an auxiliary reservoir 7, a brake cylinder 8, and an emergency reservoir 9.

The pipe bracket 5 is provided with gasket faces 10, 11 and 12, the casing 13 of the triple valve device being secured to the face 10, the casing 14 of the devices 2 and 3 being secured to the face 11 and the casing 15 of the emergency valve device 4 being secured to the face 12. Between each of these devices and its respective clamping face there is clamped a suitable gasket.

Formed in the pipe bracket are a plurality of fluid conducting passages which are open to the several gasket faces of the bracket where they are adapted to register with corresponding passages formed in the casings of the several devices secured to the bracket. There is also formed in the bracket a quick action reservoir or chamber 16.

The triple valve device 1 in the present embodiment of the invention is of the well known K type which has been converted for use in my improved equipment. In converting an old triple valve device, the check valve casing, quick action mechanism and emergency piston bushing are removed from the casing 13, leaving the chamber 17, which contained the quick action mechanism, open at one end. Within the chamber 17 adjacent its other end, a groove is formed in the casing 13 into which an annular gasket 18 is snapped. The open end of this chamber is closed by a cap 19 which is a new part and is secured to the salvaged casing 13 in any desired manner, there being a new gasket 20 interposed between the cap and casing.

Contained in the chamber 17 is a hollow filler member 21 which is clamped in sealing engagement with the annular gasket 18 and the gasket 20 by the cap 19. When clamped in place, this member defines a quick service volume chamber 22 which is open, through a choke plug 23 mounted in the member, to a quick service passage 24 defined by the casing 13 and the inner end of the member, which passage 24 is connected to the old quick service and emergency passage 25 leading to the seat of the main slide valve.

The old piston chamber cap 26 and graduating spring 27 and stop 28 carried by the cap, are secured to the salvaged casing 13, there being a new gasket 29 interposed between the cap and casing. This gasket is provided with an outer flat portion 30 and an inner thickened portion 31 which is circular in form. The thickened portion extends into the piston chamber 32 and closely engages the casing, thus providing a heel which prevents the inner edge portion of the gasket from curling inwardly from its proper position. The inner edge of the gasket closely engages with an inwardly extending lug 33 on the cap 26. The lug is of less length than the thickness of the portion 31 and serves to assist in maintaining the inner portion of the gasket in its proper position. The thickened portion 31 also constitutes a yielding stop for the triple valve piston 34 contained in the chamber 32 and is adapted to prevent the piston from moving to its old emergency position.

The triple valve piston 34 from the old triple valve device is used without change and has a stem 35 adapted to operate a main slide valve 36 and an auxiliary slide valve 37 contained in a chamber 38 connected to the auxiliary reservoir 7 through a chamber 39 in the pipe bracket 5 and a passage and pipe 40. The auxiliary slide valve 37 is new and the main slide valve 36 is from the old triple valve device, but is modified, the modifications consisting of providing the old quick service port 41 with a tail cavity 42 which is adapted to register with the old quick service passage 43 in the casing 13 in the release and retarded release positions of the triple valve device, and further consisting in the provision of a new quick service cavity 44 and a passage 45 connecting the cavity 44 to the old brake cylinder release cavity 46. In either the release or retarded release position of the triple valve device the cavity 46 connects the old brake cylinder passage 47 to the old restricted exhaust passage 48 leading to the atmosphere through the usual brake cylinder pressure retaining valve device (not shown), and the cavity 44 and passage 45 connects the passage 25 to the cavity 46.

Contained in the old cage member 49, which has screw-threaded connection with the triple valve casing 13, is a retarded release stop 50 subject to the pressure of a spring 51, said stop and spring being salvaged from the old triple valve device and used without change.

The piston 34 has a centrally arranged projection 52 which extends outwardly and is adapted to engage the inner end of the member 28 just before the piston seals against the portion 31 of the gasket 29, that is to say, before the piston is brought to a stop in brake application position by its engagement with the gasket, so that when the piston is in sealing engagement with the gasket and the brake pipe pressure is increased to effect a release of the brakes, the spring 27 acts, through the medium of the member 28, to assist fluid at brake pipe pressure acting on the inner seated area of the piston in shifting the piston out of sealing engagement with the gasket and thus more quickly expose the entire face of the piston to brake pipe pressure than if brake pipe pressure alone were relied upon to break the seal.

The cap 19 which closes the open end of the chamber 17 has formed therein a quick service passage 53 which, at one end, is open to the quick service chamber 22 and which, at the other end, registers with a quick service passage 54 in the pipe bracket 5, and also has a charging passage 55 which connects a passage 56 in the pipe bracket, leading from the emergency reservoir 9, with the passage 43 in the casing 13. This cap also has a brake pipe passage 57 which connects a brake pipe passage 58 in the pipe bracket with the old brake pipe passage 59 in the casing 13, which latter passage leads to the triple valve piston chamber 32.

The quick service valve device 2 and the combined inshot and quick service modifying valve device 3 are both carried by the casing 14, the quick service valve device being provided for the purpose of locally venting fluid under pressure from the brake pipe 6 when a light but predetermined and definite reduction in brake pipe pressure is initiated through the medium of the usual brake valve device (not shown) in effecting an application of the brakes, to propagate quick service action serially throughout the length of the train. The combined inshot and quick service modifying valve device 3 is provided for two purposes, first to cut off the further local venting of fluid from the brake pipe upon a predetermined increase in brake cylinder pressure to prevent the slack in the train from running in harshly, and secondly to provide for an inshot of fluid to the brake cylinder at a rapid rate and to cut off the rapid flow upon a predetermined increase in brake cylinder pressure.

The quick service valve device 2 may comprise a flexible diaphragm 60 which is mounted in the casing 14, said diaphragm being adapted to control the operation of a quick service valve 61 contained in a chamber 62 at one side of the diaphragm, which chamber is open to the brake pipe passage 58 through a passage 63. The valve 61 is subject on one side to the action of a spring-pressed member 64 and is adapted to control communication from the chamber 62 to a passage 65 leading to a quick service bulb or chamber 66 connected to the quick service chamber 22 in the triple valve device by way of a passage 67, past a ball check valve 68, a passage 69 and passages 54 and 53.

At the other side of the flexible diaphragm 60 there is a chamber 70 which is connected with the auxiliary reservoir 7 by way of a passage 71, chamber 39 and passage and pipe 40, said passage 71 being restricted as indicated by the reference character 72.

The combined inshot and quick service modifying valve device 3 may comprise a flexible diaphragm 73 which is mounted in the casing 14 and which is subject on one side to the action of a spring 74 contained in a chamber 75 open to the atmosphere through a passage 76. At the other side of the diaphragm there is a chamber 77 which is open to the brake cylinder through a passage 78 and a brake cylinder passage and pipe 79. The chamber 77 is normally connected through a passage 80 with a chamber 81 containing a valve 82 which is controlled through the operation of the diaphragm 73 to control the opening and closing of the passage 80, said valve being subject on one side to the action of a light coil spring 83. The brake cylinder passage 47 leading from the triple valve device is connected to the chamber 81 by way of a passage 84, past a ball check valve 85 and a passage 86. The passage 69, leading from the quick service chamber, is connected to the passage 86 through a restricted passage 87.

The portion of the passage 47 which is formed in the pipe bracket 5 is connected to the passage 79, there being a restriction 88 interposed in passage 79 between the points where the passages 78 and 84 join the passage 79.

At a point between the brake cylinder 8 and the restriction 88 the passage 79 is connected to the passage 47 past a ball check valve 89, through the ball check valve chamber 90 and a passage 91, said passage and chamber forming a by-pass connection around the restriction 88 through which fluid under pressure can only flow in one direction, i. e., from the passage 79 to the passage 47.

The emergency valve device 4 comprises a piston 92 contained in a piston chamber 93 which is open to the brake pipe passage 58 and also comprises a valve 94 contained in a valve chamber 95 and adapted to be operated by the piston 92, said valve chamber being connected to the quick action chamber 16 through a passage 96. The passage 96 is connected to the emergency reservoir passage 56 through a passage 97, there being a ball check valve 98 interposed in this passage 97 which is adapted to prevent back flow of fluid under pressure from the passage 56 to the passage 96.

The emergency piston 92 is provided with a rearwardly extending hollow portion 99 in which the stem of the valve 94 is mounted, said stem having a collar 100 which is adapted to be operatively engaged by an annular shoulder 19 on the rear end of the portion 99 of the piston to move the valve away from a seat rib 101 formed on the casing. The connection between the piston and the valve 94 is such that the piston is permitted to move rearwardly relative to the valve, which movement is adapted to be yieldably resisted by the action of a coil spring 120 interposed between and engaging the collar 100 and the piston.

Rigidly secured to the piston and extending forwardly thereof is a yoke which comprises side pieces 102 which extend through openings in a wall 103 of the casing 15 and also comprises an end piece 104 which is adapted to be engaged by a member 105 slidably mounted in the casing, said member being urged toward the end piece 104 by the action of a coil spring 106, movement of the member in the direction toward the end piece being limited by a lug 107 on the member engaging the casing.

The end piece 104 of the yoke is provided with a rearwardly extending finger 108 which is adapted to control the operation of a charging or back dump valve 109 contained in a chamber 110 in the wall 103 for controlling communication from said chamber to the emergency piston chamber 93. Normally, the finger 108 is out of engagement with the valve 109 and the valve is maintained seated by the action of a coil spring 111 contained in the chamber 110, thus the communication between the chambers is normally maintained closed. The check valve chamber 90 in the pipe bracket is connected to the valve chamber 110 through a passage 112, a check valve chamber 113 containing a ball check valve 114, a passage 115, past a ball check valve 116 and through a passage 117, the check valve being urged toward its seat by the action of a coil spring 118.

The emergency valve device 4 also comprises a fluid pressure supply valve 121 which is contained in a chamber 122 open to the emergency reservoir passage 56 and is normally maintained seated by the action of a coil spring 123 contained in the chamber. This valve is for the purpose of controlling communication from the chamber 122 to a chamber 124 which is connected to the passage 112 by way of a passage 125, past the ball check valve 114, and check valve chamber 113. The supply valve 121 has a stem 126 which extends into a chamber 127 which is open to the atmosphere through a port 128 of small diameter.

Contained in the chamber 127 is a piston 129 which is adapted to engage the piston stem 126 to control the operation of the supply valve 121. This piston is also adapted to engage the stem 130 of a vent valve 131 contained in a chamber 132 open to the brake pipe passage 58 and through the medium of the stem is adapted to control the operation of said valve. At the rear of the piston 129 there is a chamber 133 which is connected to the inner seated area of the valve 94 through a passage 134. Normally, the chamber 133 is connected to the atmosphere through a small port 135 in the piston 129, chamber 127 and port 128 in the casing. As will hereinafter more fully appear, in effecting an emergency application of the brakes, the piston 129 controls the operation of the quick action vent valve 131 to locally vent fluid under pressure from the brake pipe and to control the operation of the supply valve 121 to supply fluid under pressure from the emergency reservoir 9 to the brake cylinder 8.

In operation, to initially charge the equipment, fluid under pressure is supplied to the brake pipe 6 in the usual manner and flows from the brake pipe to the piston chamber 32 in the triple valve device by way of passage 58 in the pipe bracket 5, passage 57 in the cap 19 of the triple valve device and passage 59 in the triple valve casing 13. From the passage 59 fluid under pressure flows directly to the emergency piston chamber 93 and also to the quick action vent valve chamber 132. Fluid under pressure also flows from the passage 58 to the chamber 62 in the quick service valve device 2 through passage 63.

With the triple valve piston 34 in full release position as shown in the drawing, fluid under pressure supplied to the piston chamber 32 flows therefrom to the auxiliary reservoir 7 by way of a feed groove 136 around the piston, slide valve chamber 38, chamber 39 in the pipe bracket and pipe and passage 40. From the chamber 39 fluid under pressure flows to the diaphragm chamber 70 in the quick service valve device by way of the restricted passage 71 in the pipe bracket 5. It will here be noted that during the initial charging of the equipment the spring-pressed member 64 acts to maintain the quick service vent valve 61 seated and that when the equipment is fully charged, the fluid pressures on opposite sides of the diaphragm 60 will be substantially equal, so that the spring-pressed member will continue to maintain the valve seated. Fluid under pressure supplied to the valve chamber 38 flows to the emergency reservoir 9 by way of port 41 in the main slide valve 36 of the triple valve device, tail cavity 42 in said slide valve, passage 43, a choke plug 137, passage 55 in the triple valve cap 19, and passage and pipe 56. Fluid under pressure from the passage 56 also flows to the supply valve chamber 122 in the triple valve device.

With the emergency piston 92 in release position as shown in the drawing, fluid under pressure supplied to the piston chamber 93 flows therefrom to the valve chamber 95 through a passage 138 in the piston 92 and through a restricted branch 139 of the passage 138. From the valve chamber 95 fluid under pressure flows to the quick action reservoir 16 in the pipe bracket 5 through passage 96. If for any reason, the pressure of fluid in the emergency valve chamber 95 and quick action reservoir 16 should build up more rapidly than it does in the emergency reservoir 9, fluid under pressure will flow from the passage 96 to the passage 58 past the ball check valve 98 and through passage 97. Since the passage 58 is open to both the emergency reservoir 9 and auxiliary reservoir 7, the pressure of fluid in the emergency valve chamber 95 and quick action reservoir will equalize into the emergency and auxiliary reservoirs, thus preventing an overcharge of the quick action reservoir.

In the full release position of the triple valve device, the brake cylinder 8 is open to the atmosphere through pipe and passage 79, passage 47 in the pipe bracket 5 and triple valve device, cavity 46 in the main slide valve 36 of the triple valve device and restricted brake cylinder exhaust passage 48 leading to the usual retaining valve device (not shown) which is normally carried in cut-out position to permit the free discharge of fluid from the passage 48 to the atmosphere.

The connected quick service chambers 22 and 66 are open to the atmosphere through the choke plug 23 in the filler member 21 in the triple valve device, passages 24 and 25, cavity 44 in the main slide valve 36, passage 45 in the main slide valve and cavity 46, which latter cavity, as just described, is open to the atmosphere.

The diaphragm chamber 77 of the combined inshot and quick service modifying valve device 3 is open to the atmosphere by way of passage 78 and brake cylinder passage 79, so that the spring 74 acts to maintain the diaphragm 73 flexed outwardly and, through the medium of a valve stem, maintains the valve 82 open against the opposing pressure of the light spring 83.

With the emergency piston 92 in release position, the spring 120 acts to maintain the valve 94 seated on the seat rib 101 so that communication from the valve chamber 95 to the piston chamber 133 is closed. With this communication thus maintained closed, the piston 129 will be in its normal position as shown, so that the spring 123 acts to maintain the supply valve 121 closed and a spring 140 acts to maintain the quick action valve 131 closed.

With the equipment thus charged with fluid under pressure, a service application of the brakes is effected upon a gradual reduction in brake pipe pressure in the usual well known manner, which results in a corresponding reduction in the pressure of fluid in the triple valve piston chamber 32, the emergency piston chamber 93 and chamber 62 in the quick service valve device 2.

Upon a light reduction in the pressure of fluid in the triple valve piston chamber 32, fluid under pressure in the slide valve chamber 38 shifts the triple valve piston 34 and thereby the auxiliary slide valve 37 toward the right hand and relative to the main slide valve 36. In thus moving, the piston 34 closes the feed groove 136 so as to prevent back flow of fluid under pressure from the valve chamber 38 to the piston chamber 32, and the auxiliary slide valve 37 laps the port 41 in the main slide valve 36 to prevent back flow of fluid from the emergency reservoir 9 to the valve chamber 38 and further, the auxiliary slide valve uncovers the usual service port 141 in the main slide valve. After the feed groove 136 and port 41 are closed and the service port 141 opened, a shoulder 142 on the rear end of the piston stem 45 operatively engages the rear end of the main slide valve 36.

Upon a predetermined but light and definite reduction in brake pipe pressure and consequently in the pressure of fluid in the chamber 62 in the quick service valve device 2, fluid under pressure in the diaphragm chamber 70, as supplied from the chamber 39 and auxiliary reservoir, acts to flex the diaphragm 60 inwardly, causing the quick service valve 61 to be unseated against the opposing pressure of the spring-pressed member 64. With the valve 61 thus unseated, fluid under pressure is vented from the chamber 62 and consequently from the brake pipe to the connected quick service chambers 66 and 22. This produces a limited local quick service reduction in brake pipe pressure for effecting the acceleration of the movement of the local triple valve parts to service application position and for effecting the acceleration of the movement of the triple valve parts and of the quick service device on the next car of the train. Since the triple valve device and quick service valve device on each car will operate in a similar manner, a quick serial response to the brake pipe reduction is transmitted from one car to the next throughout the length of the train.

This local reduction is effective in the triple valve piston chamber 32, consequently the fluid under pressure in the valve chamber 38 insures the prompt movement of the triple valve piston 34 to service position, shifting both the main and auxiliary slide valves to service position. The piston in service position seals against the gasket 29. It will here be understood that in the old K type of triple valve device, the piston 34 and slide valves operated thereby had an emergency position and that since in this present equipment these triple valve parts do not have an emergency position, the gasket 29 serves to stop the piston and associated slide valves in service position.

Just before the piston engages the gasket 29 in its travel toward application position, the end of the projection 52 of the piston 34 engages one end of the member 28 mounted in the triple valve cap 26, and while the piston continues to move toward the gasket, said projection shifts the member 28 toward the right hand against the opposing pressure of the spring 27.

The main slide valve 36 in service position laps the passage 25 and a further local reduction in brake pipe pressure is effected by the flow of fluid to the brake cylinder 8 by way of the open quick service valve 61, passage 65, quick service chamber 66, passage 67, past the ball check valve 68, passage 69, restricted passage 87, passage 86, valve chamber 81 in the valve device 3, past the open valve 82, passage 80, diaphragm chamber 77, passage 78 and passage and pipe 79. The reason for effecting this further local reduction in brake pipe pressure is to insure the maintenance of the piston and slide valves in service position for a sufficient period of time to cause an effective brake cylinder pressure to be developed. This flow of fluid from the brake pipe to the brake cylinder is limited to a slow rate by the restricted passage 87, the reason for restricting the flow being to dampen or smooth out surges of fluid in the brake pipe which may have been caused by the initial local venting of fluid from the brake pipe to the quick service chambers 66 and 22.

Further, with both slide valves in service position, the service port 141 in the main slide valve 36 registers with the passage 47 and since, as before described, the auxiliary slide valve 37 has previously uncovered this port, fluid under pressure flows at a rapid rate from the slide valve chamber 38 and connected auxiliary reservoir 7 to the brake cylinder 8 by way of the service port 141, passage 47, passage 84, past the ball check valve 85, passage 86, valve chamber 81 in the combined inshot and quick service modifying valve device 3, past the open valve 82, passage 80, diaphragm chamber 77, passage 78 and passage and pipe 79, thus an application of the brakes is initiated. From the passage 47 fluid under pressure may also flow to the brake cylinder through the restriction 88 in the passage 79 and through the passage and pipe 79.

Now when a predetermined fluid pressure has been developed in the brake cylinder, say for instance a pressure of ten pounts, by the flow of fluid as above described, fluid at brake cylinder pressure in the diaphragm chamber 77 in the valve device 3, causes the diaphragm 73 to flex inwardly, permitting the spring 83 to act to seat the valve 82, thus closing off communication from the brake cylinder passage 47 to the brake cylinder and from the brake pipe to the brake cylinder by way of the diaphragm chamber 77 in the valve device 3, consequently closing off the flow of fluid from the auxiliary reservoir to the brake cylinder by way of the valve 61 and the further quick service flow of fluid from the brake pipe to the brake cylinder.

With the valve 82 of the valve device 3 seated, the further flow of fluid from the auxiliary reservoir to the brake cylinder is at a restricted rate as governed by the flow area of the restricted portion 88 of the passage 79.

It is desirable that the final quick service reduction in brake pipe pressure be continued until the aforementioned predetermined brake cylinder pressure has been developed, consequently the quick service valve 61 must remain open for a predetermined time after the triple valve parts have been shifted to service position. In order to prevent the premature operation of the quick service valve device 2 to close off the final quick service flow of fluid from the brake pipe to the brake cylinder, I provide the passage 71 with the restriction 72 which so restricts the back flow of fluid from the diaphragm chamber 70 in the quick service valve device to the chambers 39 and 38 when the pressure of fluid in these chambers is reducing by the flow of fluid to the brake cylinder, that the pressure of fluid in the chamber 70 will not reduce to that of the fluid in chamber 62 until said period of time has elapsed, thus the pressure of fluid in the chamber 70 will act to maintain the quick service valve in quick service venting position. Now when the pressures of fluid on the opposite sides of the flexible diaphragm 60 are substantially equal, the spring-pressed member 64 acts to seat the valve 61, thus closing off communication from the chamber 62 and consequently from the brake pipe to the quick service bulbs 66 and 22.

In effecting an application of the brakes it is desired to gather the slack in the train as gently as possible and to accomplish this, it is the practice to make an initial light reduction in brake pipe pressure, and after the slack has gathered to make a second heavier reduction in brake pipe pressure.

When, after the light reduction in brake pipe pressure has been effected and the brake valve device is moved to lap position in the usual well known manner, the pressure of fluid in the valve chamber 38 of the triple valve device and auxiliary reservoir is reduced, by the flow of fluid therefrom to the brake cylinder 8, to a point slightly below the pressure of fluid in the piston chamber 32, and the triple valve piston 34 will be caused to move inwardly, shifting the auxiliary slide valve 37 relative to the main slide valve 36 to cover the service port 141, thus closing off the further flow of fluid to the brake cylinder. With the flow of fluid to the brake cylinder thus closed off, the piston 34 will come to a stop when the stem 35 thereof engages the front end of the main slide valve 36. The movement of the triple valve piston from application position toward lap position is initiated by the action of the spring 27.

Now if the second reduction in brake pipe pressure is effected, the triple valve piston 34 will move from lap position to service application position, shifting the auxiliary slide valve 37 to again uncover the service port 141, so that fluid under pressure will again flow from the auxiliary reservoir 7 to the brake cylinder 8 and thus increase the brake cylinder pressure.

It will here be seen that since the combined inshot and quick service modifying valve device 3 functions to close the communication from the brake pipe to the brake cylinder when the brake cylinder pressure developed is about ten pounds upon the effecting of the initial light reduction in brake pipe pressure, no quick service action will occur when the triple valve piston 34 and slide valve 37 move from service lap position to application position. It will be further noted that the valve device 3 also closes the communication through which fluid under pressure is adapted to flow from the auxiliary reservoir 7 to the brake cylinder at a fast rate, so that the rate at which the brake cylinder pressure is developed is now governed by the rate of the flow of fluid past the restriction 88 in the passage 79 leading to the brake cylinder.

It will be understood that, upon effecting a service reduction in brake pipe pressure and upon the effecting of the local quick service reduction in brake pipe pressure, the several parts of the emergency valve device 4 will remain in their normal position as shown in the drawing for the reason that the port 138 in the emergency piston 92 will permit the flow of fluid from the valve chamber 95 and connected quick action reservoir 16 at as fast a rate as fluid under pressure is discharged from the brake pipe, so that a fluid pressure differential sufficient to move the piston is not permitted to develop.

To effect the release of the brakes after a service application, fluid under pressure is supplied to the brake pipe 6 and flows from the brake pipe to the several parts of the equipment in substantially the same manner as before described in connection with the initial charging of the equipment.

In supplying fluid under pressure to the brake pipe to effect the release of the brakes, it is customary to initially turn the usual brake valve device to release position in which fluid under pressure is supplied, by way of the brake valve device, directly from the main reservoir (not shown) to the brake pipe and then, after a predetermined interval of time, which is varied according to the length of the train, the brake valve device is turned to running position, in which latter position, the pressure of fluid supplied to the brake pipe is reduced to that normally carried in the brake pipe by the usual feed valve device (not shown).

The initial supply of fluid at high pressure to the brake pipe rapidly increases the brake pipe pressure on the cars at the front end of the train and at or near the locomotive the brake pipe pressure may be increased to substantially that carried in the main reservoir. This high head of pressure at the front end of the train is adapted to cause a rapid flow of fluid under pressure toward the rear end of the train, which serves to accelerate the release of the brakes and the charging of the brake equipment on the cars at the rear end of the train.

The rapid increase in brake pipe pressure on the cars at the front end of the train builds up a pressure differential on the emergency piston 92 which causes the piston to move in the direction toward the left hand against the opposing pressure of the spring 120 and into sealing engagement with an annular gasket 140. Upon such movement, the end of the finger 108 of the yoke carried by the piston engages and unseats the valve 109 against the opposing pressure of the light coil spring 111. With the valve 109 unseated, if the brake cylinder pressure is higher than brake pipe pressure, such as is the case after an over-reduction in brake pipe pressure has been effected, fluid under pressure will flow from the brake cylinder to the brake pipe by way of pipe and passage 79, past the ball check valve 89, ball check valve chamber 90, passage 112, ball check valve chamber 113, passage 115, past the ball check valve 116, passage 117, valve chamber 118, past the unseated valve 109, and emergency piston chamber 93, thus accelerating the recharge of the brake pipe. If the brake pipe pressure is higher than brake cylinder pressure the ball check valve 116 prevents back flow of fluid from the brake pipe to the brake cylinder.

Further, the rapid increase in brake pipe pressure on the cars at the front end of the train also builds up a pressure differential on the triple valve piston 34 which causes the piston and thereby the slide valves 36 and 37 to move to retarded release position against the opposing pressure of the retarded release spring 51. With the triple valve piston 34 in retarded release position, the flow area of the feed groove is reduced so that the flow of fluid from the piston chamber 32 to the valve chamber 38 and auxiliary reservoir 7 is restricted and with the slide valves 36 and 37 in retarded release position, fluid under pressure is supplied from the fully charged emergency reservoir 9 to the auxiliary reservoir 7 by way of pipe and passage 56, passage 55 in the triple valve cap 19, choke 137, passage 43, cavity 42 and port 41 in the main slide valve 36, valve chamber 38, chamber 39 and passage and pipe 40. Since the flow of fluid from the brake pipe to the auxiliary reservoir 7 is thus restricted and fluid under pressure is supplied from the emergency reservoir to the auxiliary reservoir, only a small amount of fluid will flow from the brake pipe to the auxiliary reservoir, consequently a greater amount of fluid will flow toward the rear end of the train than would otherwise be the case, with the result that the release of the brakes and the charging of the equipment at the rear end of the train is accelerated.

With the emergency piston 92 in sealing engagement with the gasket 140, fluid under pressure supplied to the emergency piston chamber flows to the valve chamber 95 through the restricted branch 139 of the port 138 in the piston and from the chamber 95 fluid thus supplied flows to the quick action reservoir 16 through passage 96. The volume of the valve chamber 95 and of the quick action reservoir 16 is not great, and even though the flow area of the branch 139 of the port in the piston is small, there is the tendency of carging said chamber and reservoir on the cars at the front end of the train to a pressure greater than that normally carried in the brake pipe. However, an overcharge of the reservoir and chamber is not permitted, since the passage 96 connecting the chamber and reservoir is connected, past the ball check valve 98 and through passage 97, to the passage 56 leading to the emergency reservoir. This prevents the pressure in the chamber and quick action reservoir from ever exceeding emergency reservoir pressure, which at no time becomes higher than brake pipe pressure. It will here be noted that if it were possible to overcharge the chamber 95 and quick action reservoir 16, the emergency piston would tend to operate to effect an undesired emergency application of the brakes when the brake pipe pressure reduces to normal upon the movement of the brake valve device from release to running position.

In the retarded release position of the triple valve device 1, the brake cylinder 8 is open to the atmosphere through pipe and passage 79, past the ball check valve 89, through ball check valve chamber 90, passages 91 and 47, cavity 46 in the main slide valve 36 of the triple valve device, a retarded release choke 142 in the main slide valve, a cavity 143 in the main slide valve and the passage 48. It will thus be seen that the passage 91 by-passes the restriction 88 in the passage 79 so that the rate at which fluid is vented from the brake cylinder to the atmosphere to provide a slow release of the brakes at the front end of the train is controlled by the retarded release choke 142.

When the valve 109 of the emergency valve device is open and the pressure of fluid in the brake cylinder reduces below that of the fluid in the brake pipe, the ball check valve 116 prevents back flow of fluid from the brake pipe to the brake cylinder or atmosphere.

Fluid under pressure is also vented from the diaphragm chamber 77 of the combined inshot and quick service modifying valve device 3 by way of passage 78 and passage 79 open to the atmosphere. When the pressure of fluid in chamber 77 reduces slightly below the pressure of the spring 74, said spring acts to deflect the diaphragm inwardly, thereby unseating the valve 82, thus opening communication from the brake cylinder passage 47 to the brake cylinder 8 and also opening communication from the quick service passages 69 and 54 to the brake cylinder by way of the restricted passage 87.

Fluid under pressure is also vented from the quick service chambers 66 and 22 by way of the choke plug 23 in the member 21 of the triple valve device, passage 24, passage 25, cavity 44 in the main slide valve, passage 45 in the main slide valve and cavity 46 in the main slide valve, the latter cavity being open to the atmosphere as before described.

In releasing the brakes after the brake valve device is moved from release to running position, and the fluid pressures on opposite sides of the emergency piston 92 become substantially equal, the spring 120 acts to shift the piston to its normal position as shown in Fig. 1 of the drawing in which the flow of fluid from the piston chamber 93 to the chamber 92 and quick action reservoir 16 is by way of both branches of the passage 138, the branch 139 being no longer effective to alone control the rate of flow. Upon movement of the piston, the finger 108, carried by the piston yoke, permits the spring 111 to act to seat the valve 109, thus closing communication from the brake cylinder to the brake pipe. Further, when the fluid pressures on opposite sides of the triple valve piston 34 become substantially equal, the retarded release spring 51 acts to shift the piston 34 and slide valves 36 and 37 from retarded release position to full release position. With the piston in full release position, the portion of the feed groove 136 having the greatest flow area connects the piston chamber 32 to the valve chamber 38 and due to this, the recharge of the auxiliary reservoir 7 will be at the normal rate.

In the full release position of the triple valve device, the brake cylinder passage 47 is open directly to the exhaust passage 48 by way of the cavity 46 in the main slide valve 36, so that the final release of fluid under pressure from the brake cylinder may be at the usual rate.

In releasing the brakes after a service application, the relatively slow rate of increase in brake pipe pressure at the rear end of the train causes the triple valve devices on the cars at the rear end of the train to move only to full release position, the flow of fluid through the feed groove 136 being such as to prevent a sufficient differential being developed on the piston to cause it to compress the retarded release spring 51, consequently the triple valve devices on the cars at the rear end of the train will not assume retarded release position.

In the full release position of the triple valve device on each car of the train, fluid under pressure is supplied from the emergency reservoir 9 to the auxiliary reservoir 7 at the same time as fluid is supplied from the brake pipe to the auxiliary reservoir through the feed groove 136, thereby accelerating the charging of the auxiliary reservoir up to equalization with the emergency reservoir, after which both reservoirs are charged to brake pipe pressure by fluid under pressure flowing through the feed groove 136.

It will here be understood that on the cars at the rear end of the train where, in releasing the brakes, the rate of increase in brake pipe pressure is slow, the emergency piston 92 will not be shifted from the position in which it is shown in Fig. 1.

To effect an emergency application of the brakes, fluid under pressure is suddenly vented from the brake pipe 6 which, of course, results in the sudden venting of fluid from the connected triple valve piston chamber 32 and emergency piston chamber 93. The triple valve device now operates to supply fluid under pressure from the auxiliary reservoir to the brake cylinder passage in substantially the same manner as before described in connection with a service application of the brakes.

At substantially the same time as the triple valve device moves to application position upon an emergency reduction in brake pipe pressure, fluid at quick action chamber pressure, acting on one side of the emergency piston 92, causes said piston to move toward the right hand into sealing engagement with a gasket 144. This movement of the piston is yieldably opposed by the action of the spring 106.

The emergency piston 92, as it is thus shifted, moves the valve 94 away from the seat rib 101, so that fluid under pressure from the chamber 95 and connected quick action reservoir 16 now flows to the quick action piston chamber 133, by way of passage 134, and causes the piston 129 to move toward the right hand into sealing engagement with a gasket 145. The piston, as it is thus moved, engages the ends of the stems 126 and 130 of the emergency supply valve 121 and vent valve 131 respectively, and through the medium of said stems, opens the valves.

With the vent valve 131 open, fluid under pressure is suddenly vented locally from the brake pipe by way of passage 58, vent valve chamber 132 and a chamber 146 open to the atmosphere. This sudden local venting of fluid under pressure from the brake pipe is effected for the purpose of serially transmitting emergency action throughout the length of the train in the usual well known manner.

With the emergency supply valve open, fluid under pressure is supplied from the emergency reservoir 9 to the passage 47 by way of pipe and passage 56, emergency supply valve chamber 122, past the open supply valve 121 and a fluted portion of its stem, chamber 124, passage 125, past the ball check valve 114, ball check valve chamber 113, passage 112, ball check valve chamber 90 and passage 91.

Fluid under pressure thus supplied from the auxiliary reservoir 7 and emergency reservoir 9 to the passage 47, flows at a rapid rate to the brake cylinder 8 by way of passage 84, past the ball check valve 85, passage 86, valve chamber 81 in the combined inshot and quick service modifying valve device 3, past the open valve 82, passage 80, diaphragm chamber 77, passage 78 and passage and pipe 79. Now when the brake cylinder pressure has been increased to approximately ten pounds, fluid at brake cylinder pressure in chamber 77 causes the diaphragm 73 to flex outwardly against the opposing pressure of the spring 74, permitting the spring 83 to act to seat the valve 82. With the valve 82 seated, the rapid flow of fluid to the brake cylinder is closed off and the further flow of fluid from the auxiliary and emergency reservoirs will be by the way of passage 47, restriction 88 and passage and pipe 79.

It will thus be noted that the valve device 3 functions to first permit a rapid flow or inshot of fluid under pressure to quickly provide an effective brake cylinder pressure during the train slack gathering period and to then close off the rapid flow to the brake cylinder, so that a high emergency brake cylinder pressure will be developed more slowly.

With the valve 94 of the emergency valve unseated, fluid under pressure is gradually vented from the quick action reservoir 16 and valve chamber 95 to the atmosphere through the restricted port in the quick action piston 129, chamber 127, passage 128 and chamber 146. The rate at which the quick action chamber pressure reduces is, however, slow enough to insure the piston 129 holding the vent valve 131 and emergency supply valve 121 open until the complete venting of fluid under pressure from the brake pipe is accomplished and the emergency reservoir, auxiliary reservoir and brake cylinder pressures equalize. It will here be noted that upon the venting of fluid under pressure from the chamber 95 and the quick action reservoir 16, the check valve 98 prevents back flow of fluid from the emergency reservoir passage 56 to the passage 96 connecting the chamber 95 and quick action reservoir.

Upon the substantially complete venting of fluid from the quick action piston chamber 133 and consequently from the quick action reservoir 16 and chamber 95, the springs 123 and 140 act to seat the valves 121 and 131 respectively. As the valves are thus seated, the stems thereof actuate the piston 129 to its normal position as shown in Fig. 1. With the valve 121 seated, communication from the emergency reservoir 9 to the brake cylinder is closed, and with the valve 131 seated, communication from the brake pipe to the atmosphere is closed.

To effect a release of the brakes after an emergency application, fluid under pressure is supplied to the brake pipe 6 and flows to both the triple valve piston chamber 32 and to the emergency piston chamber 93. The triple valve piston 34 is subject on one side to fluid at reduced auxiliary reservoir pressure in the valve chamber 38 and the emergency piston 92 is subject on one side to fluid at substantially atmospheric pressure in the valve chamber 95, consequently, upon a slight but definite increase in brake pipe pressure, sufficient differential is created on the emergency piston to start moving the piston and valve 94 toward the left hand, so that the piston 92 is moved to its extreme left hand or back dump position. When in its travel toward back dump position, the piston 92 reaches its normal position as shown in Fig. 1, the valve 94 is seated, closing off communication from the chamber 95 to the quick action chamber 133, and just prior to the piston sealing against the gasket, the finger 108 of the emergency piston yoke engages and unseats the valve 109, establishing communication through which fluid under pressure flows from the brake cylinder to the brake pipe.

Fluid under pressure supplied to the triple valve piston chamber 32 causes the triple valve parts to move to release position, after which the charging of the brake equipment and the release of fluid under pressure from the brake cylinder to the atmosphere occurs in substantially the same manner as before described in connection with the release of the brakes after a service application.

The combined inshot and quick service modifying valve device will, as described in connection with the release of the brakes after a service application, assume its normal position in releasing the brakes after an emergency application.

In controlling a train on a descending grade, it is customary to "cycle" the brakes, i. e., to alternately effect an application of the brakes and a recharge of the equipment while a partial release of the brakes is being effected through the retaining valve device not shown, said device being turned to brake cylinder pressure retaining position preparatory to the train descending the grade.

With the retaining valve device in retaining position and the first application of the brakes initiated, the several parts of the equipment will function to effect an application of the brakes in the same manner as before described in connection with the effecting of a service application of the brakes.

When it is desired to recharge the equipment, fluid under pressure is again supplied to the brake pipe in the usual manner, causing the triple valve device to function to connect the brake cylinder to the exhaust passage 48 in substantially the same manner as before described in connection with the release of the brakes after a service application.

When the brake cylinder pressure is reduced to a predetermined degree, say for instance to twenty pounds, the retaining valve device functions in the usual manner to prevent the further exhaust of fluid from the brake cylinder. It will here be noted that fluid under pressure is also retained in the quick service chambers 22 and 66 due to the action of the retaining valve device.

With the brake cylinder pressure retained at twenty pounds, the valve 82 of the combined inshot and quick service modifying valve device 3 is maintained closed, so that upon the next reduction in brake pipe pressure there will be no quick service venting of fluid from the brake pipe to the brake cylinder, the only quick service venting of fluid from the brake pipe being that to the partially charged quick service chambers 22 and 66. The degree of the local quick service reduction in brake pipe pressure will be in accordance with the pressure retained in the chambers 22 and 66 and will consequently be less than upon the first application when the reservoirs are at atmospheric pressure. This modified quick service reduction in brake pipe pressure insures against too high a brake cylinder pressure being developed upon a reapplication of the brakes.

When the triple valve device moves to service position, the flow of fluid to the brake cylinder will be by the way of the restriction 88 and passage and pipe 78, the seated valve 82 preventing the rapid flow of fluid to the brake cylinder.

This alternate applying and releasing of the brakes may be continued as long as desired, after which a complete release of the brakes may be effected by turning down the retaining valve device to cut-out position when a full recharge of the equipment may be obtained in the same manner as in releasing after a service application.

In Fig. 2 of the drawing a modification of the combined inshot and quick service modifying valve device 3 is illustrated which is adapted to close off the rapid flow of fluid to the brake cylinder when, in effecting a service application of the brakes, the brake cylinder pressure is increased to approximately ten pounds and to close off the rapid flow to the brake cylinder when, in effecting an emergency application of the brakes, the brake cylinder pressure is increased to a predetermined higher pressure, say for instance to fifteen pounds.

The details of this modified form of the valve device 3 are for the most part identical with those of the valve device 3 shown in Fig. 1. The modified form of the valve device as shown in Fig. 2 besides comprising all of the parts of the device shown in Fig. 1 also comprises an additional spring 147 and a plunger piston 148 having a plunger portion 149.

The spring 147 is disposed within the coil of the spring 74 and is interposed between the flexible diaphragm 73 and the end of the plunger portion 149. At one side of the plunger piston 148 there is a chamber 150, which is open to the atmosphere by way of the spring chamber 75 and passage 76, and at the other side of the piston there is a chamber 151, which is constantly open to the chamber 124 in the emergency valve device through a passage 152. With the several parts of the brake equipment in any position except emergency position, the chamber 124 and consequently the plunger piston chamber 151 is at atmospheric pressure, due to such chambers being open, in the release position of the equipment, to the atmosphere through passage 125, past the ball check valve 114, through the ball check valve chamber 113 and passage 112. With the piston chamber 151 thus at atmospheric pressure, the plunger piston will be in its normal position as shown and the spring 147 will be expanded to its free length so that the resistance it may offer to the inward flexing of the diaphragm 73 is negligible.

When a service application of the brakes is initiated, fluid under pressure will flow at a rapid rate to the brake cylinder until the brake cylinder pressure has increased to approximately ten pounds, which pressure causes the diaphragm 73 to flex inwardly against the resistance offered by the spring 74 and permits the spring 83 to act to seat the valve 81 and thus close off the rapid flow of fluid to the brake cylinder. It will be noted that in effecting a service application of the brakes and in releasing the brakes after a service application, the operation of the valve device is substantially the same as that of the corresponding device shown in Fig. 1.

When an emergency application of the brakes is initiated, fluid under pressure supplied to the chamber 124 in the emergency valve device 4 upon the unseating of the emergency valve 121, flows by way of passage 152, to the plunger piston chamber 151. Fluid under pressure thus supplied to the chamber 151 causes the plunger piston 148 to move inwardly and compress the spring 147. The additional resistance which the compressed spring 147 now offers to the inward flexing of the diaphragm 73 prevents the valve 82 from being seated until the brake cylinder pressure has been increased to approximately fifteen pounds.

In releasing the brakes after an emergency application, fluid under pressure is vented from the plunger piston chamber 151 and as a consequence, the spring 147 acts to return the plunger piston to its normal position as shown in Fig. 2. Now when the brake cylinder pressure has reduced slightly below the value of the spring 74, the valve 82 will again be unseated in the same manner as described in connection with the form of the device shown in Fig. 1.

It will be understood that with the valve device 3 shown in Fig. 1 the rapid inshot of fluid to the brake cylinder in effecting both a service and an emergency application of the brakes will continue until a brake cylinder pressure of approximately ten pounds is developed and that with the valve device shown in Fig. 2, the rapid inshot of fluid to the brake cylinder, in effecting a service application of the brakes will continue until a brake cylinder pressure of ten pounds is developed, and that in effecting an emergency application, the rapid inshot will continue until a brake cylinder pressure of approximately fifteen pounds is developed.

It is to be understood that while the operating characteristics of the equipment of the present application are quite similar to those of the equipment of my pending application, Serial No. 612,465, filed May 20, 1932, the means for imparting such characteristics to the equipments differ in many respects. However certain features which relate to both equipments such as the release insuring feature, the control of the local quick service reduction in brake pipe pressure in effecting an application of the brakes, and the supplying of fluid under pressure from the brake cylinder to the brake pipe for facilitating the release of the brakes, are broadly claimed in said pending application, the claims of the present application being limited to specific features not present in the equipment disclosed in the pending application.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake equipment for a car of a train, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, means providing an initial rapid inshot of fluid under pressure to the brake cylinder both in a service and an emergency application of the brakes and operative, regardless of the position of the brake equipment in the train, upon a predetermined increase in brake cylinder pressure both in a service and an emergency application of the brakes for restricting the rate of the final flow of fluid to the brake cylinder.

2. In a fluid pressure brake equipment for a car of a train, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, means adapted to restrict the flow of fluid to the brake cylinder, and means providing for an initial rapid inshot of fluid under pressure to the brake cylinder both in a service and an emergency application of the brakes and operated, regardless of the position of the brake equipment in the train, upon an increase in brake cylinder pressure in effecting both a service and an emergency application of the brakes for rendering the first mentioned means effective to restrict the final flow of fluid to the brake cylinder.

3. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, fluid under pressure being initially supplied both in effecting a service and an emergency application through a communication permitting a rapid flow and through a restricted communication, and means operated upon a predetermined increase in brake cylinder pressure for cutting off the communication through which fluid flows to the brake cylinder at a fast rate, said restricted communication restricting the final flow of fluid under pressure to the brake cylinder.

4. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, means normally establishing a communication through which fluid under pressure initially flows to the brake cylinder at a fast rate and operated upon an increase in brake cylinder pressure in effecting both a service and an emergency application of the brakes for closing said communication, and means restricting the final flow of fluid to the brake cylinder when said communication is closed.

5. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, a restricted passage and another passage through which fluid under pressure supplied by said mechanism flows at a rapid rate to the brake cylinder, and means operated upon an increase in brake cylinder pressure in effecting both a service and an emergency application for closing off the flow of fluid to the brake cylinder through said other passage, to provide a final slow flow of fluid to the brake cylinder.

6. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, a restricted passage and another passage through which fluid under pressure supplied by said mechanism flows at a rapid rate to the brake cylinder, and means operated upon an increase in the pressure of fluid in said other passage in effecting both a service and an emergency application of the brakes for closing off the flow of fluid through said other passage, to provide a final slow flow of fluid to the brake cylinder.

7. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, a restricted passage and another passage through which fluid under pressure supplied by said mechanism flows at a rapid rate to the brake cylinder, and means operated upon a predetermined increase in the pressure of fluid in said other passage in effecting both a service and an emergency application of the brakes for closing off the flow of fluid through said other passage, to provide a final slow flow of fluid to the brake cylinder.

8. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, means for controlling the flow of fluid under pressure to the brake cylinder to provide two rates of increase in brake cylinder pressure in effecting both service and emergency applications of the brakes, said means comprising a normally open valve past which fluid under pressure supplied by said valve mechanism initially flows to the brake cylinder in effecting both a service and an emergency application of the brakes, means operated upon a predetermined increase in brake cylinder pressure for closing said valve, and means restricting the final flow of fluid to the brake cylinder when said valve is closed.

9. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, and means operated upon a predetermined increase in brake cylinder pressure in effecting a service application of the brakes for varying the rate of flow of fluid to the brake cylinder and operated upon a different predetermined increase in brake cylinder pressure in effecting an emergency application of the brakes for varying the rate of flow of fluid to the brake cylinder.

10. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, and means operated upon a predetermined increase in brake cylinder pressure in effecting a service application of the brakes for varying the rate of flow of fluid to the brake cylinder and operated upon a greater increase in brake cylinder pressure in effecting an emergency application of the brakes for varying the rate of flow of fluid to the brake cylinder.

11. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, and means operative in effecting both a service and an emergency application of the brakes for varying the rate of increase in brake cylinder pressure, said means being operated upon the development of a predetermined brake cylinder pressure in effecting a service application and operated upon the development of a different predetermined brake cylinder pressure in effecting an emergency application of the brakes.

12. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, and means operated upon an increase in brake cylinder pressure in effecting both a service and an emergency application of the brakes for varying the rate of flow of fluid under pressure to the brake cylinder, said means being responsive to a lower brake cylinder pressure in effecting a service application than in effecting an emergency application.

13. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, valve means normally establishing communication through which fluid under pressure supplied by said valve mechanism flows to the brake cylinder at a rapid rate in effecting both a service and emergency application of the brakes and operated upon an increase in the pressure of fluid supplied through said communication for closing off the rapid flow of fluid through the communication, said valve means being responsive to a predetermined pressure in said communication in effecting a service application of the brakes and to a predetermined higher pressure in effecting an emergency application of the brakes.

14. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, valve means normally establishing a communication through which fluid under pressure is supplied to the brake cylinder in effecting both a service and an emergency application of the brakes and operated upon an increase in the pressure of fluid supplied through said communication for closing off the rapid flow of fluid through the communication, said valve means being responsive to a predetermined pressure in said communication in effecting a service application of the brakes and to a predetermined higher pressure in effecting an emergency application of the brakes.

15. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, a normally open valve past which fluid under pressure supplied by said valve mechanism flows to the brake cylinder at a fast rate in effecting both a service and an emergency application of the brakes, means normally maintaining said valve open and operated upon an increase in the pressure of fluid supplied to the brake cylinder for closing said valve, means yieldably resisting the closing of said valve, means operated upon initiating an emergency application of the brakes for increasing the resistance of the first mentioned means, and means for restricting the flow of fluid to the brake cylinder when said valve is closed.

16. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, a normally open valve past which fluid under pressure supplied by said valve mechanism flows to the brake cylinder at a fast rate in effecting both a service and an emergency application of the brakes, means normally maintaining said valve open and operated upon an increase in the pressure of fluid supplied to the brake cylinder for closing said valve, means yieldably resisting the closing of said valve, means operated by fluid under pressure supplied by said valve mechanism in effecting an emergency application of the brakes for increasing the resistance of the first mentioned means, and means for restricting the flow of fluid to the brake cylinder when said valve is closed.

17. In a fluid pressure brake equipment, the combination with a brake pipe and a brake cylinder, of a valve mechanism operated upon a gradual reduction in brake pipe pressure for supplying fluid under pressure to the brake cylinder for effecting a service application of the brakes and operated upon a sudden reduction in brake pipe pressure for supplying fluid under pressure to the brake cylinder for effecting an emergency application of the brakes, a normally open valve past which fluid under pressure supplied by said valve mechanism flows to the brake cylinder at a fast rate in effecting both a service and an emergency application of the brakes, means normally maintaining said valve open and operated upon an increase in the pressure of fluid supplied to the brake cylinder for closing said valve, spring means yieldably resisting the closing of said valve, means operated in effecting an emergency application of the brakes for increasing the resistance of said spring means, and means for restricting the flow of fluid to the brake cylinder when said valve is closed.

18. In a fluid pressure brake equipment, the combination with a brake pipe and a brake cylinder, of a triple valve device operated upon a gradual reduction in brake pipe pressure for supplying fluid under pressure to the brake cylinder to effect a service application of the brakes, an emergency valve device, said triple valve device and emergency valve device being operated upon a sudden reduction in brake pipe pressure for supplying fluid under pressure to the brake cylinder to effect an emergency application of the brakes, means for controlling the flow of fluid to the brake cylinder to provide two rates of increase in brake cylinder pressure in effecting both service and emergency applications of the brakes, said means comprising a normally open valve past which fluid under pressure supplied by either said triple valve device or said triple valve device and emergency valve device initially flows at a fast rate to the brake cylinder, and means operated upon an increase in brake cylinder pressure for closing said valve, and means for restricting the final flow of fluid to the brake cylinder when said valve is closed.

19. In a fluid pressure brake equipment, the combination with a brake pipe and a brake cylinder, of a brake controlling valve mechanism operated upon a reduction in brake pipe pressure for supplying fluid under pressure to the brake cylinder to effect an application of the brakes, means operated upon a service reduction in brake pipe pressure for locally venting fluid under pressure from the brake pipe, and means operated according to brake cylinder pressure for cutting off the local flow of fluid from the brake pipe and to vary the rate of flow of fluid supplied by said brake controlling valve device to the brake cylinder.

20. In a fluid pressure brake, the combination with a brake pipe and a brake cylinder, of a brake controlling valve device operated upon a reduction in brake pipe pressure for supplying fluid under pressure to the brake cylinder, and valve means for controlling a communication through which said valve device supplies fluid to the brake cylinder and through which fluid is vented from the brake pipe in effecting a service application of the brakes, said valve means being operated by an increase in brake cylinder pressure for cutting off said communication and thereby closing off the flow of liquid from the brake pipe to the brake cylinder.

21. In a fluid pressure brake equipment, the combination with a brake pipe and a brake cylinder, of a brake controlling valve mechanism operated upon a reduction in brake pipe pressure for supplying fluid under pressure to the brake cylinder to effect an application of the brakes, means operated upon a service reduction in brake pipe pressure for effecting a local reduction in brake pipe pressure, and means operated upon an increase in brake cylinder pressure for cutting off the local reduction in brake pipe pressure and for varying the rate of flow of fluid supplied by said brake controlling valve mechanism to the brake cylinder.

22. In a fluid pressure brake equipment, the combination with a brake pipe and a brake cylinder, of a brake controlling valve mechanism operated upon a reduction in brake pipe pressure for supplying fluid under pressure to the brake cylinder to effect an application of the brakes, means operated upon a service reduction in brake pipe pressure for effecting a local reduction in brake pipe pressure, and means operated upon a predetermined increase in brake cylinder pressure for cutting off the local reduction in brake pipe pressure and for varying the rate of flow of fluid supplied by said brake controlling valve mechanism to the brake cylinder.

23. In a fluid pressure brake equipment, the combination with a brake pipe and a brake cylinder, of a brake controlling valve mechanism operated upon a reduction in brake pipe pressure for supplying fluid under pressure to the brake cylinder to effect an application of the brakes, means operated upon a reduction in brake pipe pressure for effecting a local reduction in brake pipe pressure, valve means normally establishing communication through which fluid under pressure locally vented from the brake pipe flows and through which fluid under pressure supplied by said brake controlling valve mechanism flows to the brake cylinder, and another communication through which fluid under pressure supplied by said brake controlling valve mechanism is adapted to flow to the brake cylinder, and means for restricting the flow of fluid through the last mentioned communication, said valve means being operated upon a predetermined increase in brake cylinder pressure for regulating the local venting of fluid under pressure from the brake pipe and for rendering the restricting means effective to alone control the rate of flow of fluid to the brake cylinder.

24. In a fluid pressure brake equipment, the combination with a brake pipe and a brake cylinder, of a brake controlling valve mechanism operated upon a reduction in brake pipe pressure for supplying fluid under pressure to the brake cylinder to effect an application of the brakes, means operated upon a reduction in brake pipe pressure for effecting a local reduction in brake pipe pressure, valve means normally establishing communication through which fluid under pressure locally vented from the brake pipe flows and through which fluid under pressure supplied by said brake controlling valve mechanism flows to the brake cylinder, and another communication through which fluid under pressure supplied by said brake controlling valve mechanism is adapted to flow to the brake cylinder at a restricted rate, said valve means being operated upon a predetermined increase in brake cylinder pressure for cutting off the communication through which fluid is vented from the brake pipe and through which fluid is supplied by said brake controlling valve device to the brake cylinder.

25. In a fluid pressure brake equipment, the combination with a brake pipe, a brake cylinder, and a triple valve device operated upon a reduction in brake pipe pressure for supplying fluid under pressure to the brake cylinder and operated upon an increase in brake pipe pressure for releasing fluid under pressure from the brake cylinder, of an emergency valve device operated upon a sudden reduction in brake pipe pressure for supplying fluid under pressure to the brake cylinder to effect an emergency application of the brakes, a poppet valve normally closing a communication from the brake cylinder to the brake pipe, and means included in said emergency valve device and operated upon an increase in brake pipe pressure for actuating said poppet valve to open the communication from the brake cylinder to the brake pipe.

26. In a fluid pressure brake equipment, the combination with a brake pipe, a brake cylinder, and a triple valve device operated upon a reduction in brake pipe pressure for supplying fluid under pressure to the brake cylinder and operated upon an increase in brake pipe pressure for releasing fluid under pressure from the brake cylinder, of an emergency valve device operated upon a sudden reduction in brake pipe pressure for supplying fluid under pressure to the brake cylinder to effect an emergency application of the brakes, a poppet valve normally closing a communication from the brake cylinder to the brake pipe, means included in said emergency valve device and operated upon an increase in brake pipe pressure for actuating said poppet valve to open the communication from the brake cylinder to the brake pipe, and means preventing back flow of fluid from the brake pipe to the brake cylinder when said poppet valve is open and brake pipe pressure is higher than brake cylinder pressure.

27. In a fluid pressure brake equipment, the combination with a brake pipe and a brake cylinder, of an emergency valve device comprising an emergency valve operable to supply fluid under pressure to the brake cylinder, a piston operable by fluid under pressure for actuating said valve, an emergency piston subject to brake pipe pressure, a valve actuated by said piston upon an emergency reduction in brake pipe pressure for supplying fluid under pressure for operating the first mentioned piston, said emergency piston having a normal position in which the last mentioned valve is seated and being movable to an inner position relative to the last mentioned valve upon an increase in brake pipe pressure, and means actuated by said piston as it is moved to said inner position for connecting the brake cylinder to the brake pipe.

28. In a fluid pressure brake equipment, the combination with a brake pipe and a brake cylinder, of an emergency valve device comprising an emergency valve operable to supply fluid under pressure to the brake cylinder, a piston operable by fluid under pressure for actuating said valve, an emergency piston subject to brake pipe pressure, a valve actuated by said piston upon an emergency reduction in brake pipe pressure for supplying fluid under pressure for operating the first mentioned piston, said emergency piston having a normal position in which the last mentioned valve is seated and being movable to an inner position relative to the last mentioned valve upon an increase in brake pipe pressure, means actuated by said piston as it is moved to said inner position for connecting the brake cylinder to the brake pipe, and means preventing back flow of fluid from the brake pipe to the brake cylinder when the connection from the brake cylinder to the brake pipe is established and brake pipe pressure is higher than brake cylinder pressure.

29. In a fluid pressure brake equipment, the combination with a brake pipe and a brake cylinder, of an emergency valve device comprising a normally seated poppet valve operable to supply fluid under pressure to the brake cylinder in effecting an emergency application of the brakes, means including an emergency piston operated upon a sudden reduction in brake pipe pressure for actuating said valve, said emergency piston having a normal position and being movable inwardly beyond said normal position upon an increase in brake pipe pressure, and means operated by said piston as it is moved inwardly from its normal position for establishing communication from the brake cylinder to the brake pipe.

30. In a fluid pressure brake equipment, the combination with a brake pipe and a brake cylinder, of an emergency valve device comprising an emergency valve operable to supply fluid under pressure to the brake cylinder to effect an emergency application of the brakes, a piston for operating said valve, a normally seated valve operable to supply fluid under pressure for operating said piston, an emergency piston operated upon a sudden reduction in brake pipe pressure for operating the last mentioned valve to supply fluid under pressure to operate the first mentioned piston, means for gradually venting fluid under pressure from one side of the first mentioned piston, and means for seating said emergency valve and moving the first mentioned piston to its normal position upon substantially the complete venting of fluid from said side of the first mentioned piston.

31. In a fluid pressure brake equipment, the combination with a brake pipe and means operative to locally vent fluid under pressure from the brake pipe, of a triple valve device comprising a salvaged casing having a recess from which a quick action mechanism has been removed and which is open at one end, a member inserted in said recess, and a cap secured to said casing clamping said member to said casing and closing the open end of said recess, said member and cap defining a chamber into which fluid under pressure locally vented from the brake pipe is adapted to flow.

32. In a fluid pressure brake equipment, the combination with a brake pipe and means operative to locally vent fluid under pressure from the brake pipe, of a triple valve device comprising a salvaged casing having a recess from which a quick action mechanism has been removed and which is open at one end, a member inserted in said recess, a cap secured to said casing clamping said member to said casing and closing the open end of said recess, said member and cap defining a chamber into which fluid under pressure locally vented from the brake pipe is adapted to flow, and means normally establishing communication from said chamber to the atmosphere.

33. In a fluid pressure brake equipment, the combination with a brake pipe and means operative to locally vent fluid under pressure from the brake pipe, of a triple valve device comprising a salvaged casing having a recess from which a quick action mechanism has been removed and which is open at one end, a member inserted in said recess, a cap secured to said casing clamping said member to said casing and closing the open end of said recess, said member and cap defining a chamber into which fluid under pressure locally vented from the brake pipe is adapted to flow, means normally establishing communication from said chamber to the atmosphere, and a restriction in said communication.

34. In a fluid pressure brake equipment, the combination with a brake pipe and means operative to locally vent fluid under pressure from the brake pipe, of a triple valve device comprising a salvaged casing having a recess from which a quick action mechanism has been removed and which is open at one end, a member inserted in said recess, a cap secured to said casing clamping said member to said casing and closing the open end of said recess, said member and cap defining a chamber into which fluid under pressure locally vented from the brake pipe is adapted to flow, means normally establishing communication from said chamber to the atmosphere, and means mounted in said member for restricting the flow of fluid from said chamber.

CLYDE C. FARMER.

CERTIFICATE OF CORRECTION.

Patent No. 2,048,327.

July 21, 1936.

CLYDE C. FARMER.

It is hereby certified that error appears in the printed specification of the above numbered patent requiring correction as follows: Page 12, second column, line 1, claim 20, for the word "liquid" read fluid; and that the said Letters Patent should be read with this correction therein that the same may conform to the record of the case in the Patent Office.

Signed and sealed this 9th day of March, A. D. 1937.

(Seal)

Henry Van Arsdale
Acting Commissioner of Patents.

combination with a brake pipe and means operative to locally vent fluid under pressure from the brake pipe, of a triple valve device comprising a salvaged casing having a recess from which a quick action mechanism has been removed and which is open at one end, a member inserted in said recess, a cap secured to said casing clamping said member to said casing and closing the open end of said recess, said member and cap defining a chamber into which fluid under pressure locally vented from the brake pipe is adapted to flow, means normally establishing communication from said chamber to the atmosphere, and a restriction in said communication.

34. In a fluid pressure brake equipment, the combination with a brake pipe and means operative to locally vent fluid under pressure from the brake pipe, of a triple valve device comprising a salvaged casing having a recess from which a quick action mechanism has been removed and which is open at one end, a member inserted in said recess, a cap secured to said casing clamping said member to said casing and closing the open end of said recess, said member and cap defining a chamber into which fluid under pressure locally vented from the brake pipe is adapted to flow, means normally establishing communication from said chamber to the atmosphere, and means mounted in said member for restricting the flow of fluid from said chamber.

CLYDE C. FARMER.

CERTIFICATE OF CORRECTION.

Patent No. 2,048,327.  July 21, 1936.

CLYDE C. FARMER.

It is hereby certified that error appears in the printed specification of the above numbered patent requiring correction as follows: Page 12, second column, line 1, claim 20, for the word "liquid" read fluid; and that the said Letters Patent should be read with this correction therein that the same may conform to the record of the case in the Patent Office.

Signed and sealed this 9th day of March, A. D. 1937.

(Seal)

Henry Van Arsdale
Acting Commissioner of Patents.

CERTIFICATE OF CORRECTION.

Patent No. 2,048,327.  July 21, 1936.

CLYDE C. FARMER.

It is hereby certified that error appears in the printed specification of the above numbered patent requiring correction as follows: Page 12, second column, line 1, claim 20, for the word "liquid" read fluid; and that the said Letters Patent should be read with this correction therein that the same may conform to the record of the case in the Patent Office.

Signed and sealed this 9th day of March, A. D. 1937.

(Seal)

Henry Van Arsdale
Acting Commissioner of Patents.